United States Patent Office 3,020,163
Patented Feb. 6, 1962

3,020,163
MANUFACTURE OF CHEESE
James Bryan Stine, Lincolnwood, Ill., assignor to National Dairy Products Corporation, Chicago, Ill., a corporation of Delaware
No Drawing. Filed Dec. 15, 1958, Ser. No. 780,235
6 Claims. (Cl. 99—116)

This invention relates to the manufacture of cheese made by the Emmenthaler process which in the United States is usually called the Swiss process, cheese made by the process usually being called Swiss cheese.

It is the object of this invention to provide Swiss cheese of uniform quality and to eliminate certain of the prior art difficulties in production.

Swiss cheese is usually made by a series of involved and time honored steps which coact to produce a body of cheese having a characteristic nut-like flavor and cells or eyes within the body. During curing, the volume of the body of cheese expands because of the bacterial action which generates gas within the body and which causes the formation of the cells or bubbles. Each of the steps of the process has a designed function and the steps cooperate to produce the proper eye formation which is one of the criteria of good Swiss cheese.

According to the usual procedure heretofore used, milk which has been standardized to about 3 percent fat is placed in a kettle or vat and warmed to the proper degree for setting. (With certain processes it is possible to use milk having a fat content as high as 3.5 percent or more, but usually milk of somewhat lower fat content is employed.) When the milk is at the proper temperature, which is between about 85° and 95° F., it is inoculated with a suitable culture of the types of bacteria necessary to produce the characteristic nutty flavor of Swiss cheese and the requisite eyes. The cultures which are used may include *Lactobacillus bulgaricus*, *Streptococcus thermophillus*, and *Propionibacterium shermanit*. Rennet is added to the milk to coagulate the milk and to set it into a soft curd.

After the coagulation has proceeded to the proper point, the curd is cut into small pieces with a so-called "harp." This is a frame which carries a series of spaced apart wires. After the curd is cut, it is stirred in the whey and cooked at a temperature of from about 120° to about 135° F., the cooking temperatures usually being in the range of about 125° to 130° F. The stirring in the whey is continued until the curd reaches the desired firmness and density, and until it has the desired knitting characteristics. During the heating and stirring the curd particles shrink and become more dense and at the end of the cooking process they approximate in size a grain of wheat.

After the curd is in the proper condition, as determined by the cheese maker, the whey is removed from the curd and the curd is quickly formed into the desired shape.

In the wheel process, a piece of heavy cloth is slipped under the mass of curd in the cooking kettle and it is lifted out of the kettle, the whey draining out through the cloth much in the manner of a jelly sack. The curd while still at substantially the cooking temperature is immediately deposited in a large round hoop having a depth of 6 to 8 inches and having a suitable diameter. The curd is immediately pressed into the hoop to shape the curd and to promote whey drainage, after which it is maintained under pressure and is turned at intervals.

Another method of producing the block of curd is shown in Patent No. 2,494,637, issued on January 17, 1950. This patent describes a method of making Swiss cheese which involves pumping the curd and whey, after the cooking operation has been completed and while the curd is in a heated condition from the cooking operation, into a large vat wherein the curd is formed into a block under whey, after which the whey is drained from the curd. There is no turning or other manipulation of the curd in this process but the curd is formed into its ultimate shape at substantially the cooking temperature as in the bag process.

In both the old wheel process and the process of Patent 2,494,637, the curd is held for a considerable period of time under weights while the draining is completed, by the end of which time the curd has become knit into a homogeneous body which is ready for further processing. In both processes the curd gradually cools from the cooking temperature to room temperature over a prolonged period of time, e.g., 6 to 10 hours.

After the curd has been consolidated and knit together and after it has been pressed over night, the exterior surface of the curd is salted as by floating it in a tank of cool brine (50–60° F.) for 1 to 4 days. In some instances, a shorter period is employed and in other instances a somewhat longer period is employed. The brining salts the exterior surface of the block of curd, which salt works into the block during the curing operation.

The body of curd is then removed from the brine and is cured by either the traditional wheel method which involves periods in the cold room and the hot room, as well as frequent turnings and saltings, or by the process of Patent 2,494,636. In either instance, the temperature control during the process causes the bacteria to develop gas within the body which results in the formation of bubbles or eyes within the body. Usually the curing includes a hot room period of from 2 to 6 weeks, during which the body of curd is maintained at a temperature of from 70° to 80° F. which results in the gas-producing activity of the bacteria.

In the case of Swiss cheese made by any of the known processes, the body of cheese often has the characteristic known in the trade as "one-sidedness." A cheese which exhibits this characteristic develops eyes or cures more rapidly on one side than on the other side and as a result one side of the block may have eyes that are either incompletely developed or overdeveloped by the time that the other side of the cheese has obtained proper eye development.

I have discovered that this one-sided condition in the cheese can be corrected or minimized by introducing a step in the process which has heretofore been considered undesirable. As has been pointed out, in the prior art processes it has always been thought desirable to form the cheese into the body of curd at substantially the same temperature at which the body of curd has been cooked, allowing of course a slight amount of cooling which is inherent in transferring the curd and whey from the cooking vat into the molding form. It has been discovered, however, that if the cooked curd at the time it is ready for whey separation is rapidly cooled to a temperature materially lower than the final cooking temperature, but which temperature is above that at which the curd absorbs enough water to substantially interfere with the curing of the cheese, the one-sided condition can be minimized or avoided.

As has been pointed out above, the Swiss cheese process generally involves a cooking temperature of from between 120° and 135° F. at the conclusion of the cooking and stirring steps of the process. In accordance with the improved process of this invention, the curd in whey is rapidly cooled from the cooking temperature to a temperature in the range of from about 110° to 90° F. With some curd it may be found that cooling to 90° F. will cause the absorption of too much water and that the curing characteristics of the cheese may be somewhat impaired. Any chance of impairment of the curing characteristics may be avoided by cooling to the preferred range of from about 110° to 100° F. Excellent results may be obtained for a curd if the cooling is carried out to reduce the temperature of the curd and whey mixture to about 105° F.

The rapid cooling is preferably accomplished by indirect heat transfer such as by the use of a cooling jacket around a pipe through which the curd and whey are pumped or the use of coils located within the hollow walls of the make-vat through which a coolant may be circulated. If the curd is cooled in the make-vat, the stirring of the mixture is preferably continued so that the entire volume of curd and whey is subjected to rapid cooling without subjecting any localized portion of the contents of the vat to too low a temperature. The cooling is preferably carried out as rapidly as possible but in any event it is desirable to accomplish the cooling in a period of less than about 15 minutes.

Another method of cooling which may be employed but with somewhat less satisfactory results is the addition of cold water to the curd and whey to bring the temperature of the curd and whey mixture to the ranges described above.

After the cooling step is completed the curd may be molded into the desired shape and cured in accordance with the known processes to produce a curd having little or no tendency to cure into a cheese having a so-called "one-sided" condition.

Various features of the invention which are believed to be new are set forth in the appended claims.

I claim:

1. The improvement in the process of making Swiss cheese which comprises rapidly cooling the curd after it has been cooked to the proper degree, from about the cooking temperature to a temperature of between about 110° F. and 90° F., that is, materially lower than the cooking temperature but above the temperature at which the curd absorbs enough water to interfere with the curing of the cheese, said cooling being effected in a period of less than about 15 minutes.

2. The improvement in the process of making Swiss cheese which comprises rapidly cooling the curd after it has been cooked to the proper degree, from the cooking temperature to a temperature of between about 110° F. and 90° F. while it is still mixed with the whey, said cooling being accomplished in a period of less than about 15 minutes.

3. The improvement in the process of making Swiss cheese which comprises rapidly cooling the curd after it has been cooked to the proper degree, from the cooking temperature to a temperature of between about 110° F. and 100° F. while it is still mixed with the whey, said cooling being accomplished in a period of less than about 15 minutes.

4. The method of manufacturing Swiss cheese which includes the steps of preparing and subdividing the curd, heating the curd to a temperature within the range of between 120° F. and 135° F., and stirring the curd mixture in the whey while heated until the curd particles have acquired the conventional characteristics, then rapidly lowering the temperature of the mixture to a range between about 110° F. and 90° F. while the curd is still in particle form and dispersed in whey, said cooling being effected in a period of less than about 15 minutes, and then draining the whey from the curd, placing the curd in a mold, and curing the curd.

5. The method of manufacturing Swiss cheese which includes the steps of preparing and subdividing the curd, heating the curd to a temperature within the range of between 120° F. and 135° F., and stirring the curd mixture in the whey while heated until the curd particles have acquired the conventional characteristics, then rapidly lowering the temperature of the mixture to a range between about 110° F. and 100° F. while the curd is still in particle form and dispersed in whey, said cooling being effected in a period of less than about 15 minutes, then draining the whey from the curd, placing the curd in a mold, and curing the curd.

6. The method of manufacturing Swiss cheese which includes the steps of preparing and subdividing the curd, heating the curd to a temperature within the range of between 120° F. and 135° F., and stirring the curd mixture in the whey while heated until the curd particles have acquired the conventional characteristics, then rapidly lowering the temperature of the mixture to about 105° F. while the curd is still in particle form and dispersed in whey, said cooling being effected in a period of less than about 15 minutes, then draining the whey from the curd, placing the curd in a mold, and curing the curd.

References Cited in the file of this patent

UNITED STATES PATENTS

| | | |
|---|---|---|
| 821,334 | Buskit | May 22, 1906 |
| 1,334,693 | Doane | Mar. 23, 1920 |

OTHER REFERENCES

U.S.D.A. Handbook No. 54, "Cheese Varieties," pages 124–126.